United States Patent [19]
Grouffal et al.

[11] Patent Number: 6,061,299
[45] Date of Patent: May 9, 2000

[54] METHOD OF TRANSMITTING COMPRESSED SEISMIC DATA

[75] Inventors: Christian Grouffal, Rueil-Malmaison; Van Bui-Tran, Massy, both of France

[73] Assignee: Institut Francais du Petrole, Rueil-Malmaison, France

[21] Appl. No.: 08/958,038

[22] Filed: Oct. 27, 1997

Related U.S. Application Data

[63] Continuation-in-part of application No. 08/887,056, Jul. 2, 1997.

[30] Foreign Application Priority Data

Dec. 19, 1996 [FR] France .................................. 96 15823

[51] Int. Cl.$^7$ ...................................................... G01V 1/22
[52] U.S. Cl. ................................................ 367/49; 367/77
[58] Field of Search ................................. 367/76, 79, 49, 367/77, 80; 369/49; 340/15.5

[56] References Cited

U.S. PATENT DOCUMENTS

| | | | |
|---|---|---|---|
| 4,112,412 | 9/1978 | Howlett | 367/79 |
| 4,218,767 | 8/1980 | Joosten et al. | 367/79 |
| 4,408,307 | 10/1983 | Harris | 367/79 |
| 4,509,150 | 4/1985 | Davis | 367/76 |
| 4,583,206 | 4/1986 | Rialan et al. | 367/78 |
| 4,628,494 | 12/1986 | Rialan et al. | 367/79 |
| 4,815,044 | 3/1989 | Deconinck et al. | 367/77 |
| 4,905,205 | 2/1990 | Rialan | 367/77 |
| 4,908,803 | 3/1990 | Rialan | 367/77 |
| 4,979,152 | 12/1990 | Rialan | 367/77 |
| 5,706,250 | 1/1998 | Rialan et al. | 367/77 |
| 5,822,273 | 10/1998 | Bary et al. | 367/77 |

*Primary Examiner*—Christine K. Oda
*Assistant Examiner*—Victor J. Taylor
*Attorney, Agent, or Firm*—Antonelli, Terry, Stout & Kraus, LLP

[57] ABSTRACT

The invention relates to a two-phase method of transmitting, to a central station (CS), seismic signals received by seismic receivers (R) and picked up by collecting units (A) disposed in the field. In the first phase, a compression is applied to each seismic trace, the ratio of which is adapted to the duration of a transmission window placed in the time intervals between successive seismic transmission-reception cycles, as well as to the rate of the transmission route used. The compressed trace as a whole is thus transmitted, allowing an operator at central station (CS) to check qualitatively that recording took place correctly in each collecting unit (A) even though he does not have the exact trace available. In the second phase, at the end of the current seismic session for example, the seismic traces are reconstituted in the central station with the necessary accuracy, either by complete transmission of the data preferably after prior compression, or, in certain cases, by transmission of residues eliminated in the first phase for the requirements of the first transmission.

34 Claims, 10 Drawing Sheets

FIG. 6A scale: Haar

FIG. 6B wavelet: Haar

FIG. 6C scale: D4

FIG. 6D wavelet: D4

FIG. 6E scale: D10

FIG. 6F wavelet: D10

FIG. 6G scale: D20

FIG. 6H wavelet: D20

METHOD OF TRANSMITTING COMPRESSED SEISMIC DATA

CROSS-REFERENCE TO RELATED APPLICATIONS

This application is a continuation-in-part application of Ser. No. 08/887,056, filed on Jul. 2, 1997.

BACKGROUND OF THE INVENTION

1. Field of the Invention

The present invention relates to a data transmission method using compression techniques to optimize the use of available transmission routes.

2. Description of the Prior Art

Various seismic data transmission systems are used to connect local acquisition units to a central station either directly or via intermediate stations having local-unit concentration or control functions of varying complexity. The links can be provided by means of cables, radio links, one or more relays, or a combination of cable and radio links as indicated for example in French Patents 2,720,518, 2,696, 839, 2,608,780, 2,599,533, 2,538,561, 2,511,772, or 2,627, 652 of the applicant.

French Patent 2,608,70 of the assignee teaches in particular the use of acquisition units provided with two transmission routes, one with a relatively high transmission rate and the other with a passband that can be relatively narrow depending on local availability of transmission frequencies, which are more readily available in the current radio transmission regulatory framework. The seismic data collected in successive cycles are stored in a mass memory in each of the units and transferred intermittently to a central control and recording station. To allow the operator in the central station to check that data acquisition by each of the acquisition units is proceeding normally, partial data transmissions are made, which fit into a transmission route with a relatively narrow passband.

French Patent 2,625,627, also by the assignee, teaches the use of seismic acquisition units provided in particular with specialized means for processing signals which undergo numerous tests.

The present trend, particularly with so-called 3D seismic prospecting methods, is to distribute hundreds or even thousands of seismic receivers over the area to be surveyed, on land, at sea, or in coastal areas, often over several kilometers. The volume of data to be collected and transmitted grows continually. To prevent transmission problems from hampering the progress of seismic systems, the trend is to use data compression methods chosen for compatibility with the requirements of the geophysicists.

Seismic data compression can save a great deal of space in the mass storage modules in local acquisition units and/or local control and concentration stations, and save a great deal of transmission time.

Numerous methods of data compression exist. They can be divided into two major classes, depending on whether or not they involve loss of information, and whether or not alteration in the data after their decompression can be tolerated.

Particularly in geophysics, it is essential for compression losses to be as small as possible because the most: pertinent information is often very small in amplitude and can be isolated from background noise only by digital processing of several traces. Possible losses in accuracy are tolerable only in very particular cases, if the information transmitted is merely for monitoring equipment operation and visualizing the shape of the sampled traces.

Known methods of data compression can be divided into two families: (a) compression methods with no information loss and (b) methods leading to information loss, with the data restored losing some part of the accuracy of the original data.

a) Of the methods in the first family, methods may be cited that are directed at eliminating data redundancy or so-called dictionary methods in which each word is replaced by its index in a reference table; these are most useful when the files to be compressed contain a great deal of redundancy. A method also known as RLE (run-length encoding) is highly suitable for files containing long sequences of identical values.

Statistical coding methods are also known, in which the data are replaced by a code with the same meaning but taking less space. The Huffman coding method for example consists of associating with a datum a code whose length varies with its frequency of occurrence. Arithmetic coding methods represent a variable number of data by a constant quantity of bits.

A known compression technique known as "LPC" (linear predictive coding) is suitable for compressing sound waves. It consists essentially of replacing a signal sample s(t) by a prediction made from p previous samples, assuming that the signal is stationary.

Instead of transmitting the sample s(t), its prediction s^(t) is transmitted, namely the prediction coefficients and the residues e(t), namely the difference between the actual value and the prediction made at time t, which on decompression yields the value s(t)=s^(t)+e(t) ). If the prediction is correct, the residues are small and take up less space than the initial values s(t). The number of coefficients used to calculate s^(t) is generally small and they occupy less space than s(t). The same applies to e(+) which usually has a smaller amplitude than $\Delta(t)$.

In the family of compression methods with losses where the objective is to make the best possible model of a signal with a smaller number of bits, the quantification method, for example, may be cited where a piece of information of n bits is represented by another code only on p (p<n) bits, then, upon decompression, these p bits are extended over n bits by shifting, which brings about substantial losses.

According to other methods such as the DCT (discrete cosine transform) method very often used for image compression, the signal is cut up into blocks of fixed sizes, then each of them is modeled by a set of coefficients which do not represent the amplitude of the signal in time but rather its frequency spectrum. Compression appears by eliminating the highest-frequency coefficients.

Other methods based on wavelet transforms are also used, and described for example by:

Bosman, C. et al., Seismic Data Compression Using Wavelet Transforms, 83rd Annual Meeting SEG.

Vetterli, M. et al. Wavelets and Filter Banks, IEEE Transactions on Signal Processing, Vol. 40, No. 9, September 1992;

Coifman, R. et al, Best Adapted Wave Packet Bases, Numerical Algorithms Research Group, Yale University, or Daubechies, I., Ten Lectures on Wavelets, CBMS-NSF, 1993.

Any given signal is represented in a base of functions that are translated versions (temporal) and dilated versions (frequency) of a wavelet. Representation of the signal by wavelets translates into a set of different coefficients by means of which the signal can be expressed from a wavelet function base. Transmitting the signal is then equivalent to transmitting these coefficients; compressing it is equivalent to expressing it by a smaller set of coefficients.

SUMMARY OF THE INVENTION

The transmission method according to the invention comprises the use of known coding techniques, chosen in order to flexibly integrate the data transmission phases in the classical sequence of a seismic survey both in purely land regions and in coastal areas where the seismic data collected by acquisition units can be the result of waves sent by underground discontinuities coming from seismic sources towed underwater, and by water or air guns for example.

The method according to the invention has applications particularly in the field of seismic prospecting where it is necessary to transfer frequently a large quantity of data to a central station such as a recording truck. Signals are picked up by a very large number of receivers such as geophones associated with a geological formation to be studied, in response to vibrations emitted by a seismic source and sent back by underground discontinuities. The signals picked up are collected by local acquisition units, sometimes distributed over a distance of several kilometers, and each designed to collect the signals received by one or more receivers, digitize them, apply pretreatments of variable complexity to them, and store them in a local memory before their real-time or delayed transmission to a collecting station by a transmission roue such as a cable, an optical fiber, a radio channel, etc.

In the first case, explosive charges for example are used. Each time, the land team installs several charges, and the time intervals between successive shots of these charges can be relatively short, for example reduced to the useful reception window—in practice a few tenths of a second. Between each salvo a longer time elapses allowing the land team to position a new set of charges.

In the second case, the towing vessel zigzags along parallel lines alternately in one direction then in the opposite direction. A new series of transmission-reception-acquisition cycles takes place along successive trajectories, at relatively short intervals depending on the time to re-set the source used. Between a successive series of cycles a relatively long time elapses for the ship to go about and start a new trajectory on a new heading.

The transmission method according to the invention is designed to make the most of this irregular distribution of heavy seismic data collection times, in the normal practice of seismic surveys, to make control transmissions that check correct acquisition by each of the acquisition units in the field, and check on complete reception of the seismic data by a central control station so that all the seismic data transmitted can be compiled without loss, with a minimum transmission time being necessary.

The method according to the invention is appropriate for transmitting data between one or more local collecting units picking up seismic data such as seismic traces or portions of traces for example, and a central control station, by at least one transmission route. The method comprises two-phase transmission of seismic data with, in the first phase, transmission of compressed data allowing the quality of local unit operation to be checked and, in the second phase, transmission of data allowing loss-free recording of the seismic data at the remote station.

The method comprises for example local data recording, compression of the data at a selected compression ratio, followed by a first phase in which the compressed data are transmitted, determination of the difference between the locally recorded data and the corresponding compressed data, a second following phase in which this difference is transferred, and reconstitution at the central station of the seismic data collected by each local collecting unit, by combining the data received in the two transmission and transfer phases.

The data compression technique and/or the compression ratio to be applied to the data is/are chosen as a function for example of the length of an available transmission window and the transmission rate permitted by the transmission route used.

According to one embodiment, the seismic data collected are recorded locally after compression involving essentially no loss and the significant part is transmitted with a compression ratio involving a loss.

Depending on the case, one can use either the same compression technique for the seismic data transmitted in the first phase and the seismic data transmitted in the second phase, or a different technique for the two phases.

The method according to the invention is appropriate for example for transferring to the central station by at least one transmission route the seismic traces collected by the local acquisition units during the data acquisition sessions each involving a plurality of recording cycles of seismic signals sent by underground discontinuities in response to seismic signals transmitted through the ground by a seismic source, the various cycles in a single session being separated from each other by specific time intervals. The sessions are for example working days. The time intervals between sessions may for example be due to technical interruptions necessary to modify or shift the field equipment or realign a shooting ship along a new axis for example.

The method can be implemented for example by effecting a first compression of each seismic trace with a first compression ratio sufficient to be transmitted during one of the time intervals, the recording, in a local acquisition unit, of each seismic trace compressed substantially without loss with a second compression ratio, determination of the difference between the compressed seismic traces at the first and second ratios, respectively, delayed transfer of this difference during a time interval between the sessions, either using a second transmission route (cable, optical fiber, radio channel, etc.) or by moving a mass memory up to the collecting units to read their memory modules, and reconstitution of each seismic trace at the central station in order for example to check that each local collecting unit is operating correctly.

The first compression is effected for example by applying a compression technique with loss, using for example a wavelet transform technique with a ratio involving losses.

To obtain compressed data without loss, for example a statistical prediction technique can be applied to the seismic data with determination of prediction coefficients and prediction errors, a fraction of the prediction errors being transmitted in the first phase, transmission of the second phase involving the fractions of prediction errors not transmitted during the first phase.

The system in accordance with the invention includes local collecting units with data recording devices, a processing assembly performing data compression with a selected compression ratio, a device for determining the difference between the data recorded locally and the corresponding compressed data, a transmitter for transmitting compressed data, a transfer device for transferring the difference to the station, and a processing assembly in the remote station which reconstitutes the seismic data collected by each local collecting unit, by combining the transmitted data and the transferred data, and optionally means in each local collecting unit a device for applying a second compression of the loss-free type with a second compression ratio to the seismic data.

Each local collecting unit has for example a computer with a signal processor programmed to compress data.

BRIEF DESCRIPTION OF THE DRAWINGS

Other characteristics and advantages of the the invention are apparent from reading the description hereinbelow of a nonlimiting embodiment, with reference to the drawings wherein.

DESCRIPTION OF THE PREFERRED EMBODIMENTS

Figure 1:
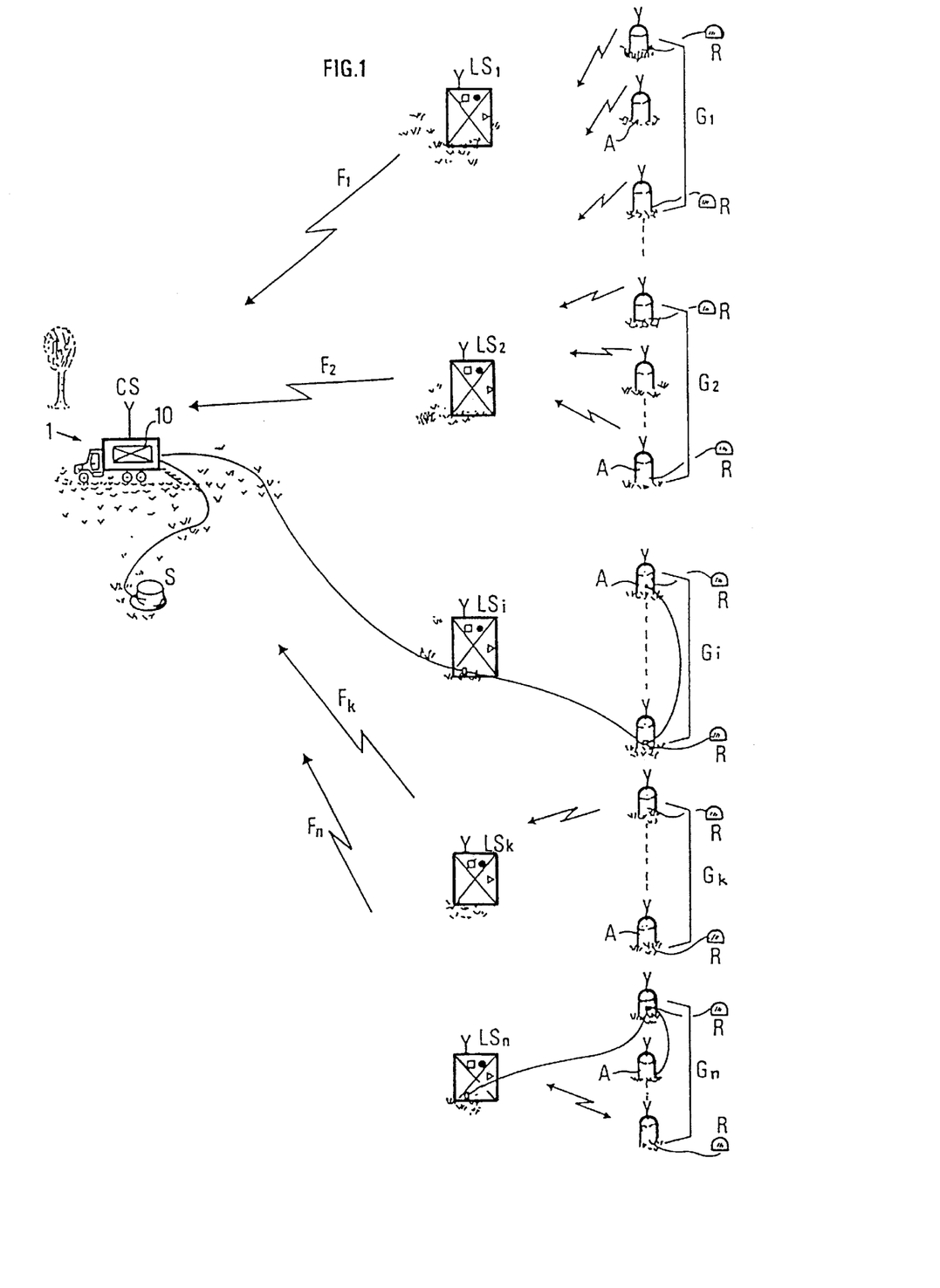
FIG. 1 shows schematically a seismic data acquisition and transmission device.

The seismic device shown schematically in FIG. 1 comprises a considerable array (several hundred to several thousand) of seismic receivers R distributed at intervals from each other over an area to be surveyed, according to an arrangement suitable for the type of prospecting, 2D or 3D. The receivers pick up seismic waves sent by underground discontinuities in response to transmission in the ground of seismic waves produced by a source S, and a central control and recording station 1 where all the seismic signals collected are finally centralized by the transmission system to be described. Each of receivers R is usually made of a string of aligned elementary sensors each of which produces a "seismic trace."

The device has a set of local units A for collecting seismic data, each designed to pick up at least one seismic trace.

The set of collecting units A communicates with a central station CS either directly (by radio or by cable) or through intermediate stations LS with functions of varying complexity. These may be concentrators designed to organize and sequence the exchanges between the local units A and the central station as described for example in European Patent 594,477 by the assignee. In addition to these concentration functions, each intermediate station LS may command and control various tasks carried out by local units A under the control of the central station as described in French Patent 2,720,518. Each of these intermediate stations LS for example controls a number p of local collecting units A. They communicate with the units of their respective groups by a radio link or possibly by a transmission line. The intermediate units communicate with the central station SC by radio channels F1, F2, . . . Fn. Collection of the seismic data stored in the various acquisition units can also be done by direct transfer to a mass memory moving over the terrain past each of them in turn.

The device has a seismic source S. Depending on the case, this may be a pulsed source such as an explosive charge for example producing a seismic trace, or a vibrator. This source may be coupled with the terrain of the area surveyed and connected by radio or control cable with the central station or, where coastal areas are being surveyed, towed at depth by a shooting ship connected by radio to the central station.

Each acquisition device A, (FIG. 2) is designed to collect for example k traces picked up by a number k of seismic receivers $R_1$, $R_2$, $R_k$. For this purpose, it has for example ($k \geq 1$) acquisition chains $CA_1$ to $CA_k$ receiving the k signals and each having a low-pass filter $F_{11}$, $F_{12}$, . . . $F_k$, a preamplifier $PA_1$, $PA_2$, . . . $PA_k$, a high-pass filter $F_{21}$, $F_{22}$, . . . $F_{2k}$, and a digital-analog converter (ADC) $C_1$, $C_2$, . . . , $C_k$ to convert the amplified, filtered analog signals into digital words. All the chains are connected to a microprocessor 2 processing digital words of 16 to 32 bits for example, programmed to control the acquisition and exchanges with central station 1. Two blocks of memory $M_1$ and $M_2$ and a memory Mp for the programs are associated with control microprocessor 2. Processor 2 is connected to a radio or line transceiver unit 3, configured for the transmission route used for communication with central station CS or corresponding intermediate station LS. If this is a radio link, unit 3 has a radio transmitter RE and a radio receiver RR which communicates with an antenna 4. An interface unit 5, described in the aforesaid French Patent 2,608,780, also allows communication by infrared with an initialization unit 6 by means of which an operator can communicate addressing and acquisition chain function parameter selection instructions to the control processor 2.

Figure 2:
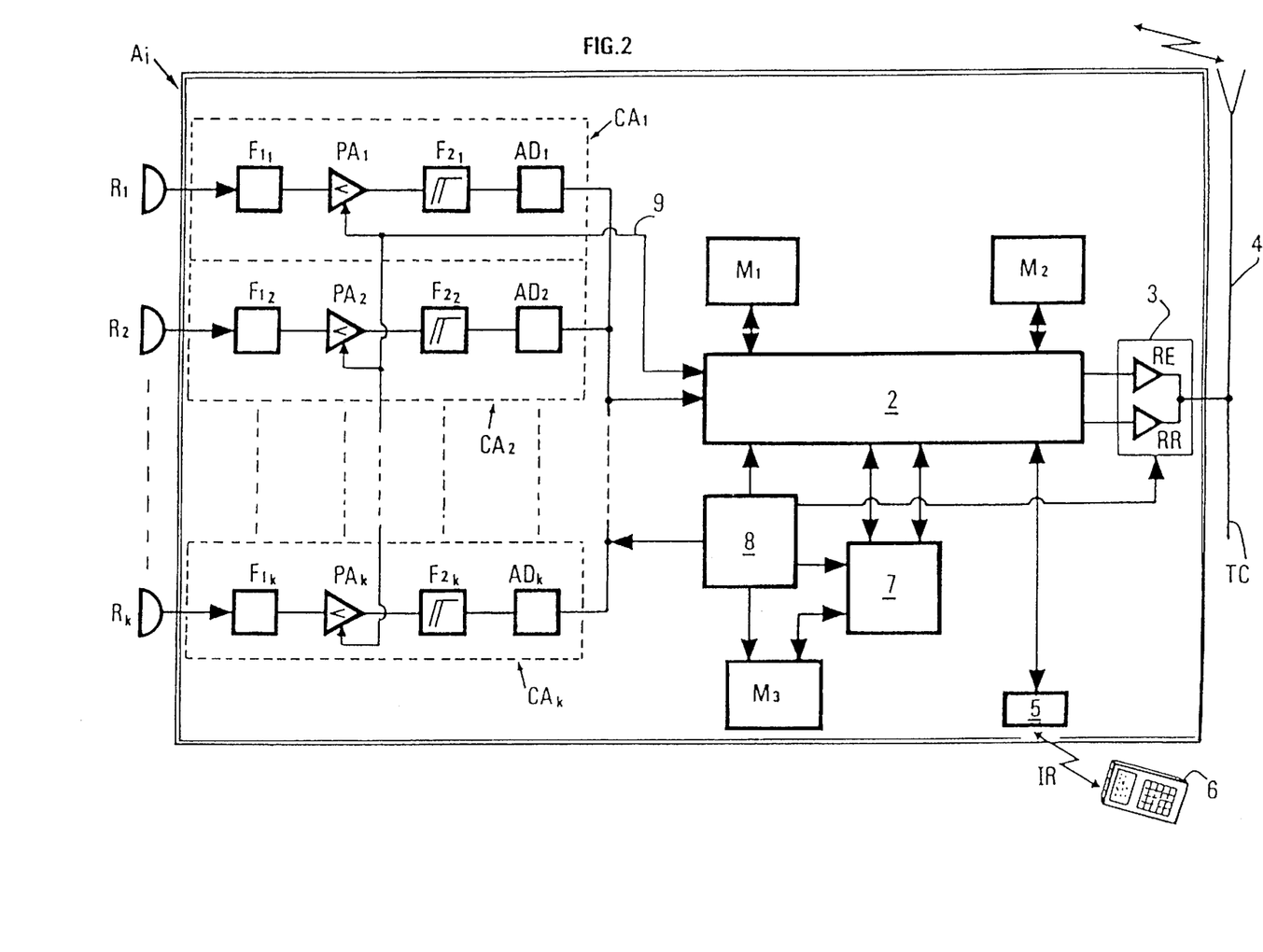
FIG. 2 shows schematically, in the form of functional blocks, the internal structure of a local acquisition unit.

The system according to the invention preferably has in each acquisition unit $A_i$, a processor 7 specializing in signal processing. It may be example be a 32-bit floating point processor of the DSP 96002 type for example associated with a DMA type device to speed up transfers by data blocks between two processors 2 and 7. A working memory Mp is added to the latter. Each acquisition unit also has its own power supply 8.

Processor 2 acts as a master. Its functions are to decode the orders transmitted by central station 1 and to control:

acquisition of signals from receivers $R_1$ to $R_k$ by the various acquisition chains, transmissions in relation to unit 3, memories $M_1$ and $M_2$ for temporary data storage, inputs/outputs, interrupts between programs, and exchanges with calculation processor DSP 7, etc.

By its very structure, calculation processor DSP 7 is particularly suitable for high-speed execution of operations such as format conversions, complex-number multiplications, FFT type Fourier transforms, correlations between signals received and signals transmitted, digital filtering, summations of successive shots with elimination of non-seismic interference noise, combinations between themselves of signals delivered by multi-axis seismic receivers such as triaxial geophones for example, etc. The preprocessing done locally before transmission contributes to substantially reducing the number of tasks assigned to central station 1 and hence the installed computing power which becomes considerable when the number of seismic traces to be picked up in real time is several hundreds or even over a thousand.

As will be described hereinbelow, the processor 7 of each collecting unit A is also programmed to apply one or more data compression algorithms to the traces collected in order to reduce the volume of data and to make the most of the time intervals of varying length occurring between the transmission-reception cycles or "shots" of a given series of cycles or between successive series of "shots."

Upon each of the successive transmission-reception cycles, a seismic trace is digitized and recorded in a memory of each collecting unit Ai.

Loss-Free Compression

Preferably, a loss-free type compression is applied to the trace. It may be for example the aforementioned predictive technique known as LPC where the amplitude s(t) of a signal sample at a time t (FIG. 3) is calculated by a prediction made from a number p of samples at time (t-1), (t-2), (t-3), . . . (t-p).

Figure 3:
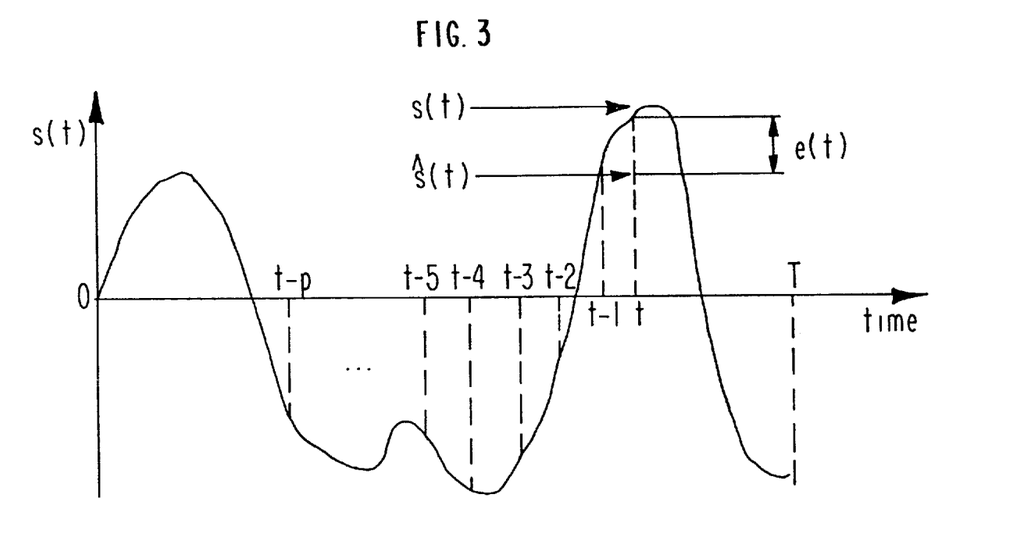
FIG. 3 illustrates the known technique of statistically predicting the sampling value of a signal.

The predicted value is calculated according to the relation:

$$\hat{s}(t) = \sum_{j=1}^{p} a_j \cdot s(t-j) \qquad (1)$$

Figure 4:
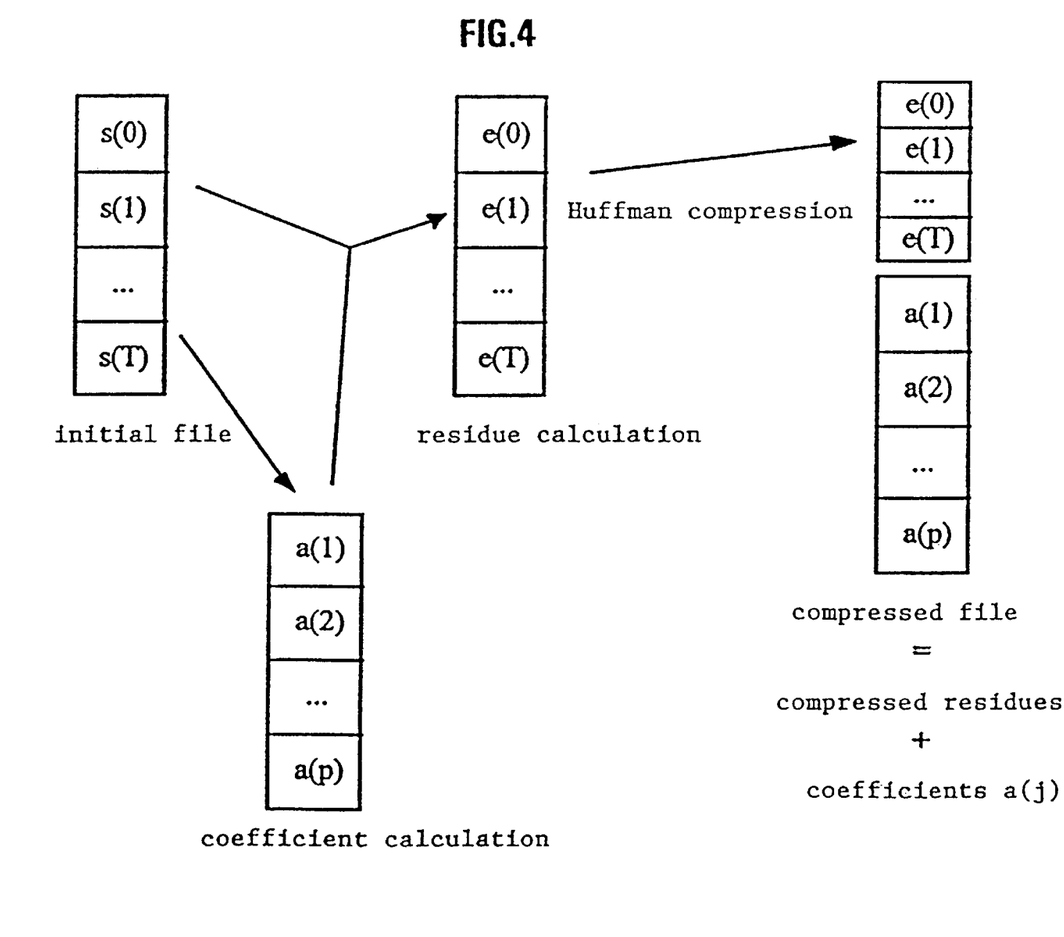
FIG. 4 shows the signal compression operations schematically.

Instead of transmitting the sample, its prediction s^(t) is transmitted, namely the prediction coefficients and the residues e(t), i.e. the difference calculated between the actual value s(t) and the prediction s^(t) made at time t, which gives the value s(t)=s^(t)+e(t) (FIG. 4). If the prediction is correct, the residues are small and take up less space than the initial values s(t).

In the decompression stages (FIG. 5), the signal is restored according to the following formula $$s(t) = \sum_{j=1}^{p} a_j \cdot s(t-j) + e(t); \quad \text{with} \quad t \in [0, T] \qquad (2)$$

Figure 5:
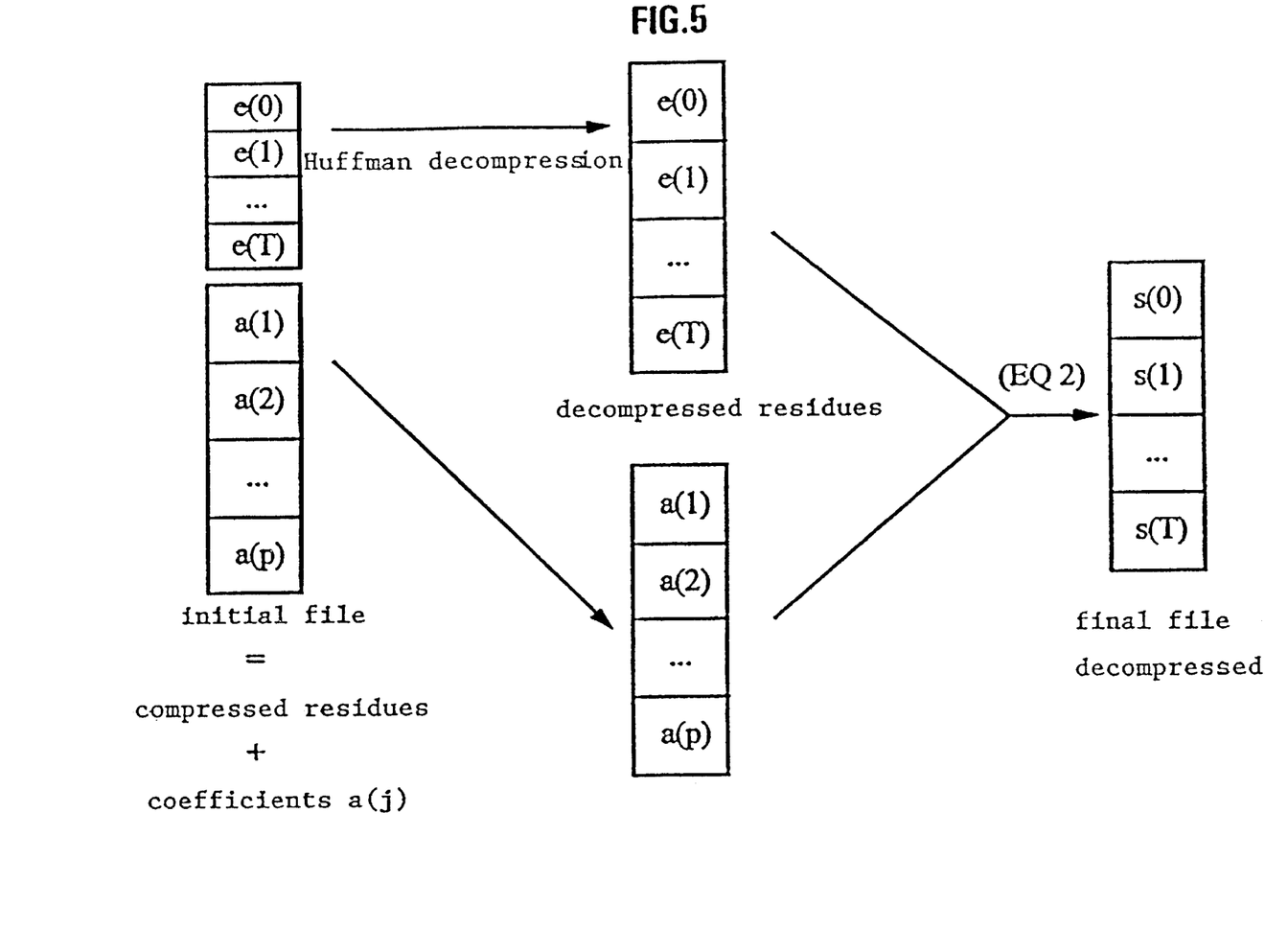
FIG. 5 shows the symmetrical signal decompression operations schematically.
Figure 6A:
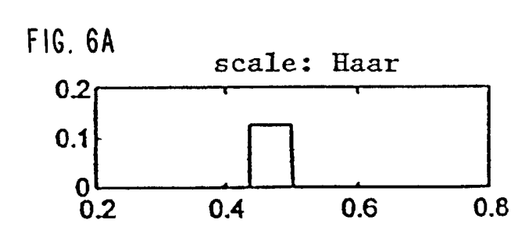
FIG. 6 shows various wavelets for analyzing a signal to be compressed.
Figure 6B:
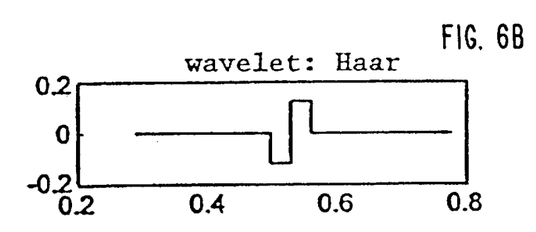
Figure 6C:
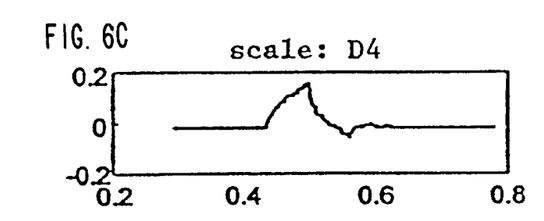
Figure 6D:
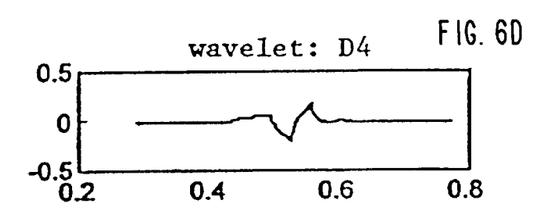
Figure 6E:
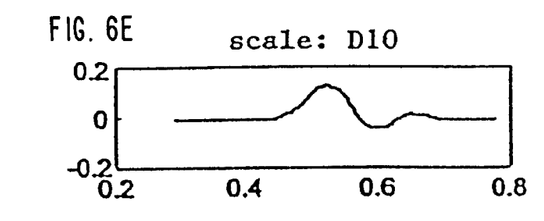
Figure 6F:
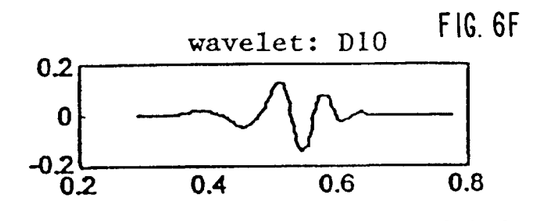
Figure 6G:
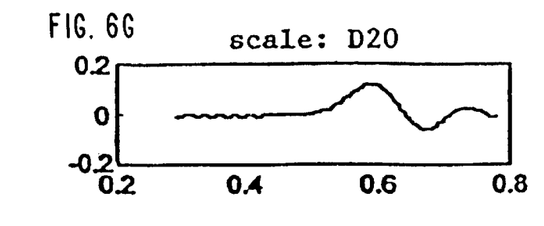
Figure 6H:
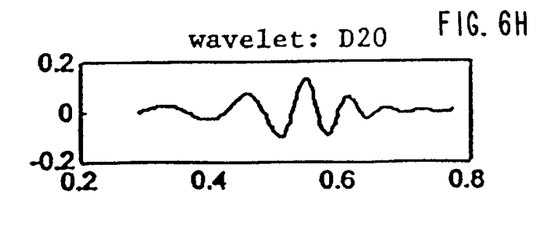
Figure 7:
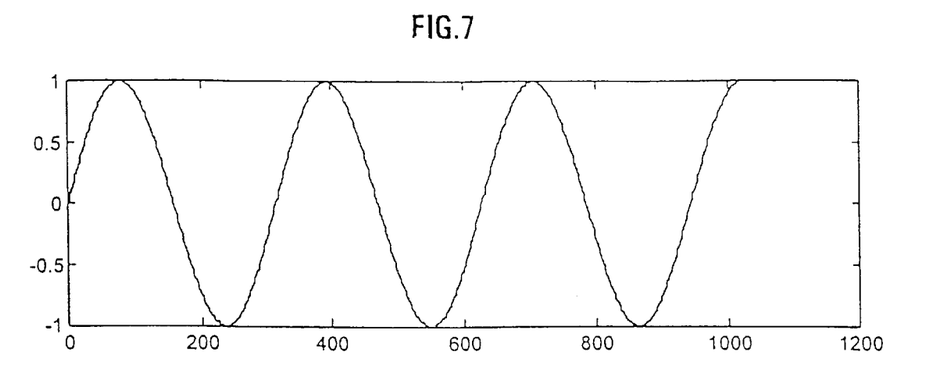
FIGS. 7, 8, and 9 show respectively a sine-wave signal and Haar wavelet and its D20 wavelet transforms.
Figure 8:
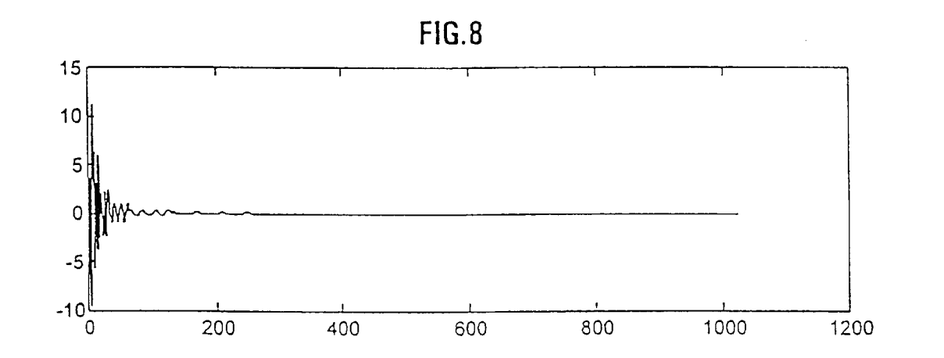
Figure 9:
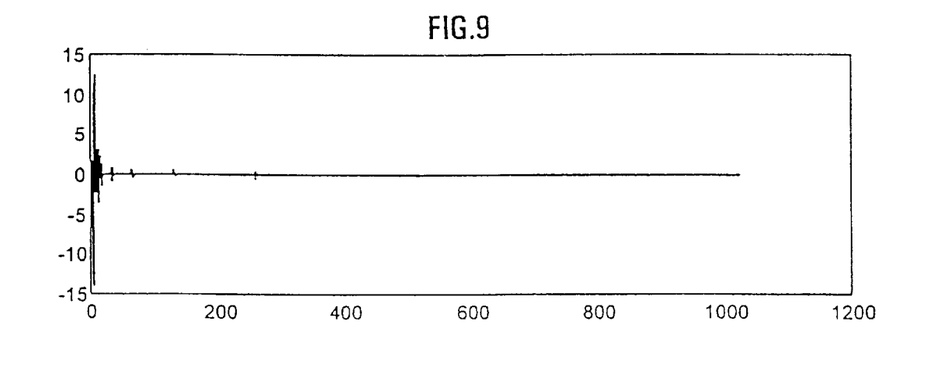
Figure 10A:
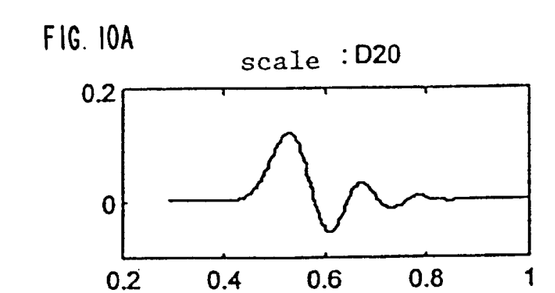
FIG. 10 shows various wavelet and scale functions suited for compressing seismic signals.
Figure 10B:
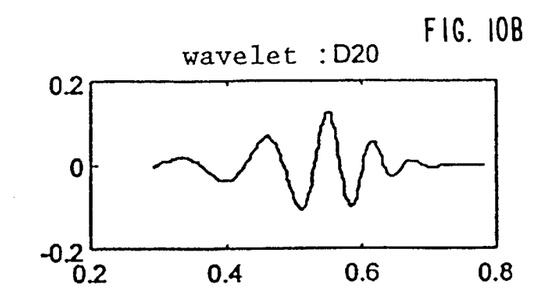
Figure 10C:
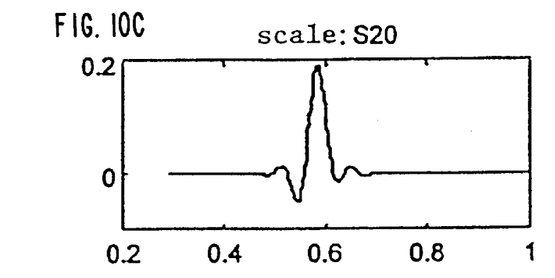
Figure 10D:
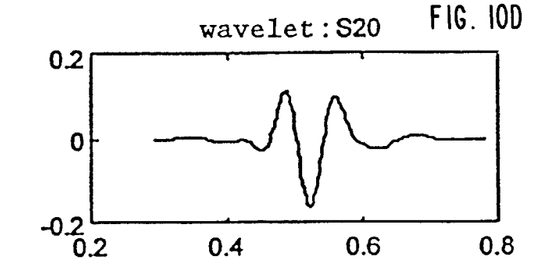
Figure 10E:
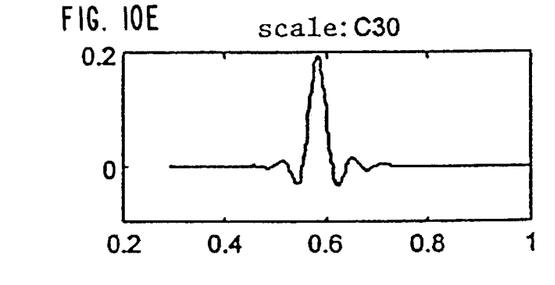
Figure 10F:
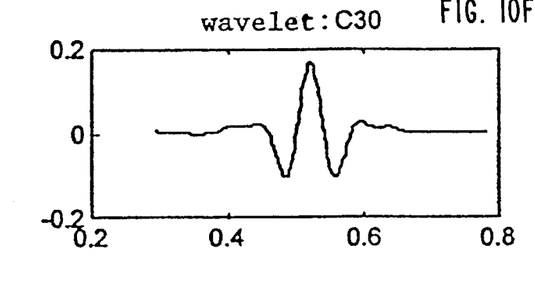

At time t, the values of s at lesser times have already been calculated, so we know s(t-j) for j∈[1, p]. The values s(t-j) from equation (2) that are not known for t ∈ [0, p-1] are replaced by the value 0. To predict the value of a sample, the interpolation polynomial is selected and applied to one or more of the above sample values to minimize the residues, as is known.

Compression with Loss

The method according to the invention involves application to each trace of a relatively large compression ratio chosen such that this compressed trace can be transmitted over a relatively narrow transmission route in a transmission window imposed by the sequence of transmission-reception sessions. The duration of one acquisition cycle is approximately several seconds (6 s for example), usually greater than the time interval between two successive cycles. Hence, the compression type and the ratio are usually chosen so that for example the whole of the trace in this imposed window or at least a significant part thereof can be transmitted.

The result is generally an information loss that can be tolerated here because the data transmitted are for checking purposes. Examination of the trace, even slightly distorted by compression, is enough for an operator in the CS station (FIG. 1) to check that the trace was indeed recorded.

This first transmission with losses for checking purposes is used in the method according to the invention to reconstitute each of the traces at the station as they were recorded after compression without loss in memories $M_1$, $M_2$ (FIG. 2) of each collecting unit A. Rather than transmitting the considerable quantity of data corresponding to all the traces stored during a given series or daily session without loss, it is calculated, in each collecting unit, the difference between the trace compressed without loss (or possibly the actual non-compressed trace) and the compressed trace that was previously sent for checking purposes. To reconstitute each trace at the central station, only this difference is transmitted in the second phase. This two-phase transfer procedure considerably reduces overall the time that would otherwise have been necessary to collect the complete traces.

The compression technique used can also be that based for example on the wavelet transform.

Wavelet analysis consists of breaking any signal down into a base of particular functions of a subspace having specific properties. A wavelet f or y is a function whose translated (temporal) and dilated (frequency) versions form a base of this subspace. The objective is to model a signal by looking at where (in time) the irregularities of the signal (for example sudden changes or high frequencies) may be located.

We use f for the "scale" function which gives a low-pass filtered version of the original signal, and y for the "wavelet" function that gives details (high-pass filter) between two consecutive versions filtered by f. Hence, the combination of the above pieces of information allows us to reconstituting the original signal given certain conditions. The filters used for the forward wavelet transform are "analysis filters" and those used for the inverse transform are "synthesis filters."

A number of known wavelet families exist. For example a filter family called "quadrature mirror filters" (QMF) may be used which allow an analysis filter identical to the synthesis filter at an inversion close to the order of the coefficients.

This wavelet transform gives a list of coefficients, and compression occurs by canceling the lowest-amplitude coefficients, less than a given threshold. The number of coefficients to be kept intact is up to the user who is aware that the higher the number, the better the approximation (perfect reconstruction is obtained from all the coefficients) when the inverse transform is done. It should be noted that the order of the coefficients is essential for reconstruction and thus even zero coefficients must be preserved. These coefficients, once quantified in whole numbers, are highly suitable for a compression of the RLE type referred to above.

It is preferable to use a wavelet suited for filtering certain signal frequencies. Finally, for this type of transfer, (FIG. 10) the wavelet can be chosen with the capacity to concentrate the maximum signal energy in the low frequencies which will be the best from the compression standpoint.

Figure 11:
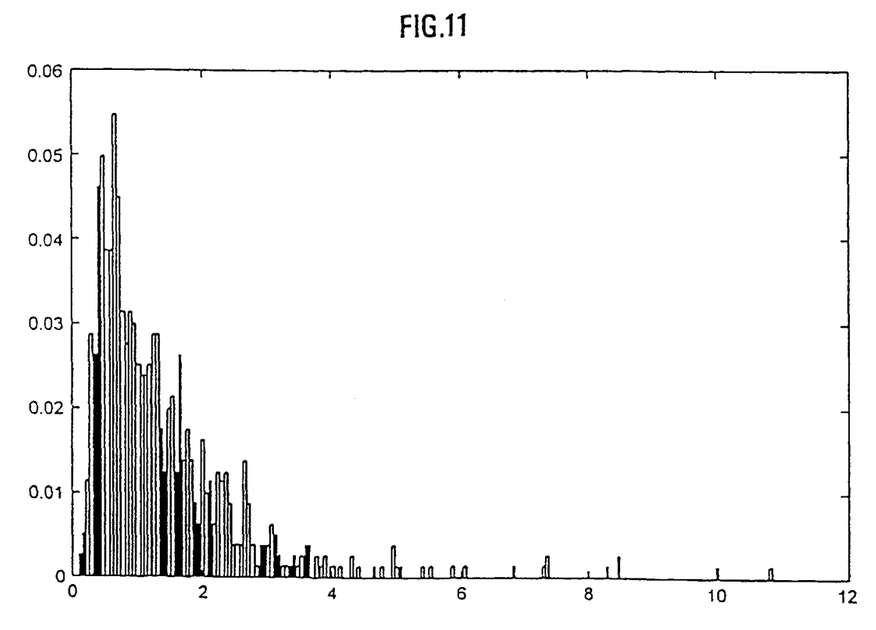
FIG. 11 shows a root mean square (RMS) bar chart obtained for example with an S20 wavelet for a pulsed seismic signal.
Figure 12:
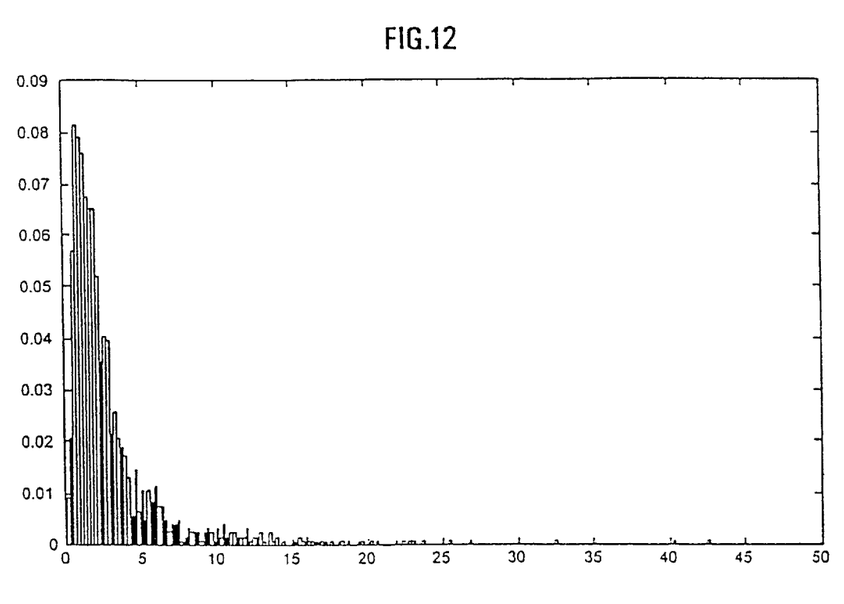
FIG. 12 shows a similar bar chart for a vibrating seismic signal.

To evaluate the quality of the reconstruction, the root mean square (RMS) (FIGS. 11 and 12) can be determined that measures the reconstruction error in the direction of the signal energy, defined as follows:

$$RMS = \sum_i \frac{(x_i - \tilde{x}_i)^2}{x_i^2} * 100$$

where $x_i$ is a sample of the original signal and $\tilde{x}_i$ is a sample of the reconstructed signal is determined (FIGS. 11 and 12).

A known method facilitating selection of the wavelet family that is best suited to the nature of the seismic signals to be processed is the wavelet packet transform method, which forms a "library" of wavelet bases, assigns a score to each base with a cost function such as the logarithm of energy or entropy, the score measuring the importance of the information contained in this base; then selecting the highest-scoring bases, allowing better reconstitution of the signal. Compression also occurs by canceling the lowest coefficients.

For example, a cost function of a known type defined as follows can be used:

$$\lambda = -\sum_j x_j^2 \cdot \log(x_j^2)$$

where $x_j$ is the set of "j" coefficients of a given base and $\lambda$ is the cost of this base.

The number of coefficients necessary for reconstructing the signal determines the compression ratio applied. In this case, this ratio is imposed by the fixed phasing of the seismic transmission-reception cycles defining the transmission windows of the compressed traces transmitted for checking purposes. Thus, in the first phase, only the most significant part of the wavelet coefficients is sent.

In the second phase, the interruption time intervals inherent in the survey technique used are employed to transmit the difference between the complete seismic trace and the part already transmitted for checking purposes, in this case the residues, i.e. the complete series of transform coefficients.

Examples of root mean squares obtained as a function of the number of coefficients are given below:

In pulsed-source seismic prospecting:

| number of coefficients | compression ratio | RMS |
| --- | --- | --- |
| 100 | 97% | 1.36% |
| 500 | 91% | 14e-3% |

In vibrator seismic prospecting:

| number of coefficients | compression ratio | RMS |
| --- | --- | --- |
| 100 | 83% | 3.18% |
| 500 | 57% | 28e-2% |

For 100 significant wavelet coefficients ($T_s$=97%, $T_v$=91%), the following root mean squares are obtained by WPT for the traces as a whole:

|  | D20 | C30 | S20 |
| --- | --- | --- | --- |
| explosive | 1.53% | 1.38% | 1.36% |
| vibrator | 3.33% | 3.24% | 3.18% |

The wavelet with symmetric tendencies (C30 and S20) prove to be the most suitable.

Vibrator seismic prospecting proves to be more difficult to reconstruct than pulsed seismic prospecting, in practice. Here for example is the same operation with 500 coefficients ($T_s$=83%, $T_v$=57%):

|  | D20 | C30 | S20 |
| --- | --- | --- | --- |
| explosive | 16e-3% | 14e-3% | 14e-3% |
| vibrator | 29e-2% | 28e-2% | 28e-2% |

The errors become negligible for a very useful compression ratio, particularly with the explosive method.

Implementation:

Various methods of implementation can be used for this two-phase transmission.

1) Two different compression modes can be combined, one for compressing the data to be transmitted in the first phase for quality-checking purposes, with loss, and the other for compressing the data recorded in each acquisition unit with a view to delayed transmission in the second phase. In this case, the quality-checking data can be used for that purpose alone, as the transmission in the second phase covers all the traces compressed.

2) Or a single compression mode can be used to compress the data and two compression ratios can be applied to them, the first being without loss for local data recording and the second involving losses being applied to the data (all of each trace for example) designed to be transmitted in the first phase for quality-checking purposes.

a) Where a wavelet transform is used to translate the data by a series of coefficients with decreasing values, the compression ratio applied can be chosen by selecting the limited number of coefficients transmitted for quality checking, compatible with the time window available for their transmission between two "shots." This number is fixed by selecting only coefficients above a certain threshold value. The choice can be imposed by the operator or left up to the local processing system. In the second phase, all the coefficients of the compression of which each trace is to be reconstituted exactly are transmitted.

b) In the case where the LPC type coding technique for example is used, the residues translating the differences between the complete data compressed without loss and those transmitted with loss in the first phase are stored in the memories of each local collecting unit A, the residues being transmitted in the second phase to the central station for reconstitution of the signals.

If the LPC type coding technique is used, which, as referred to above, involves transmission of prediction coefficients and prediction errors e(t), the method, in the first phase, transmits only part of these errors. For this transmission only the higher-weighted bits of the words coding these errors are used. The data received by the operator are degraded but sufficient for the operator to check them for quality.

In the second phase of the transmission, transmission of the not-yet-transmitted residues of the errors truncated in the first phase is performed so that at the reception station CS reconstitute all the seismic data can occur loss.

3) According to another embodiment which is appropriate if some degradation of the seismic signals can be tolerated, compression ratios $\tau_1$, $\tau_2$ that are different for the seismic data depending on whether they are transmitted in the first phase or in the second phase are chosen. With the wavelet compression method, in the first phase a restricted number of coefficients of the transform are transmitted, the number being compatible with the time window available for transmission between two "shots," selecting only for example coefficients higher than a given threshold value, and, in the second phase, a number that is higher but less than the total number, depending on the expected quality of the signals on reception, is transmitted.

Other variants are possible without departing from the framework of the invention if they are compatible with the principle of two-phase transmission of seismic data with, in the first phase, transmission of compressed data for checking the operating quality of local units and, in a second phase, transmission of data allowing loss-free recording of the seismic data at the remote station.

One embodiment of the method by means of a processing assembly in each acquisition unit involving a DSP type signal processor has been described. It is evident however that any calculating device able to carry out all the required compression operations could be used for this purpose.

What is claimed is:

1. A method for transmitting to a remote station seismic data sensed by seismic receivers and collected by at least one seismic acquisition unit from at least one transmitter by at least one transmission channel at a data transmission rate during a time interval of data transmission comprising:

locally storing the seismic data collected by the at least one seismic acquisition unit; and a first transmission step of transmitting compressed data to the remote station with a compression rate depending on the data transmission rate or the time interval; and a second subsequent transmission step of transmitting data to the remote station which permits recording without loss of the seismic data at the remote station.

2. A method as claimed in claim 1, wherein:

the compressed data include at least a part of the seismic data sensed by each seismic acquisition unit.

3. A method as claimed in 1, further comprising:

using an identical compression technique for the seismic data transmitted during the first transmission step and the seismic data transmitted during the second transmission step.

4. A method as claimed in claim 1, further comprising:

using a different compression technique for the seismic data transmitted during the first transmission step and the seismic data transmitted during the second transmission step.

5. A method as claimed in claim 1, further comprising:

using a wavelet transform technique to obtain compressed data.

6. A method as claimed in claim 1, further comprising:

using a statistical prediction technique for obtaining the compressed data.

7. A method as claimed in 2, further comprising:

using an identical compression technique for the seismic data transmitted during the first transmission step and the seismic data transmitted during the second transmission step.

8. A method as claimed in claim 2, further comprising:

using a different compression technique for the seismic data transmitted during the first transmission step and the seismic data transmitted during the second transmission step.

9. A method as claimed in claim 2, further comprising:

using a wavelet transform technique to obtain compressed data.

10. A method for transmitting to a remote station seismic data sensed by seismic receivers and collected by at least one seismic acquisition unit from at least one transmitter by at least one transmission channel at a data transmission rate during a time interval of data transmission comprising:

locally recording without loss the seismic data collected by the at least one seismic acquisition unit; and a first transmission step of transmitting compressed data to the remote station with a compression rate depending on the data transmission rate or the time interval; and determining a difference between the data recorded without loss and corresponding transmitted compressed data; a second subsequent transmission step of transmitting the difference to the remote station which permits recording without loss of the seismic data at the remote station; and reconstructing at the remote station the seismic data collected by each seismic acquisition unit, by combining the data transmitted in the first and the second transmission Steps.

11. A method as claimed in claim 10, wherein:

the compressed data include at least a part of the seismic data sensed by each seismic acquisition unit.

12. A method as claimed in 10, further comprising:

using an identical compression technique for the seismic data transmitted during the first transmission step and the seismic data transmitted during the second transmission step.

13. A method as claimed in claim 10, further comprising:

using a different compression technique for the seismic data transmitted during the first transmission step and the seismic data transmitted during the second transmission step.

14. A method as claimed in claim 10, further comprising:

using a wavelet transform technique to obtain compressed data.

15. A method as claimed in claim 10, further comprising:

using a linear predictive coding technique utilizing determination of prediction coefficients and prediction errors, a fraction of the prediction errors being transmitted in the first transmission step; and transmitting data in the second transmission step including fractions of the prediction errors not transmitted during the first transmission step.

16. A method as claimed in 11, further comprising:

using a second transmission channel for transmitting the seismic data during the second transmission step.

17. A method as claimed in 11, further comprising:

using an identical compression technique for the seismic data transmitted during the first transmission step and the seismic data transmitted during the second transmission step.

18. A method as claimed in claim 11, further comprising:

using a different compression technique for the seismic data transmitted during the first transmission step and the seismic data transmitted during the second transmission step.

19. A method as claimed in claim 11, further comprising:
using a wavelet transform technique to obtain compressed data.

20. A method as claimed in claim 19, further comprising:
selecting wavelet transform coefficients higher than a given threshold value for compression of the data by the local acquisition unit.

21. A method as claimed in claim 11, further comprising:
using a linear predictive coding technique utilizing determination of prediction coefficients and prediction errors, a fraction of the prediction errors being transmitted in the first transmission step; and transmitting data in the second transmission step including fractions of the prediction errors not transmitted during the first transmission step.

22. A system for transmitting seismic data to a remote station by at least one transmission channel at a data transmission rate during a time interval of data transmission comprising:
at least one local seismic data acquisition unit including a data acquisition and recording device; and
a processing assembly which compresses the seismic data and determines a difference between data recorded by the acquisition and recording device and corresponding compressed data; and
a transmission assembly which transmits to the remote station during a first transmission step the compressed seismic data with a compression rate depending on the data transmission rate or the time interval and which transmits during a second subsequent transmission step data produced by determining the difference between the recorded data and the corresponding compressed data; and a processing assembly in the remote station which reconstructs the seismic data collected by each local data acquisition unit by combining data transmitted during the first and the second transmission steps.

23. A system as claimed in claim 22, wherein:
the processing assembly in the at least one local seismic data acquisition unit applies a second compression without loss with a second compression ratio to the seismic data recorded in the data acquisition and recording device.

24. A system as claimed in claim 22, wherein:
each local data acquisition unit is provided with a computer including a signal processor programmed for compressing seismic traces.

25. A method for transmitting to a remote station seismic data sensed by seismic receivers and collected by at least one seismic acquisition unit from at least one transmitter by at least one transmission channel at a data transmission rate during a time interval of data transmission Comprising:
locally recording the seismic data collected by the at least one seismic acquisition unit;
and a first transmission step of transmitting compressed data to the remote station with a compression rate depending on the data transmission rate or the time interval; and
a second subsequent transmission step of transmitting data to the remote station which permits recording without loss of the seismic data at the remote station; and locally recording the seismic data without loss of compression and wherein the compressed data transmitted during the first transmission step is compressed with a compression rate involving a loss.

26. A method as claimed in 25, further comprising:
using a second transmission channel for transmitting the seismic data during the second transmission step.

27. A method as claimed in 25, further comprising:
using an identical compression technique for the seismic data transmitted during the first transmission step and the seismic data transmitted during the second transmission step.

28. A method as claimed in claim 25, further comprising:
using a different compression technique for the seismic data transmitted during the first transmission step and the seismic data transmitted during the second transmission step.

29. A method as claimed in claim 25, further comprising:
using a wavelet transform technique to obtain compressed data.

30. A method as claimed in claim 25, further comprising:
using a linear predictive coding technique utilizing determination of prediction coefficients and prediction errors, a fraction of the prediction errors being transmitted in the first transmission step; and
the transmitting of the data during the second transmission step includes fractions of the prediction errors not transmitted during the first transmission step.

31. A method for transmitting to a remote station seismic data sensed by seismic receivers and collected by at least one seismic acquisition unit from at least one transmitter by at least one transmission channel at a data transmission rate during a time interval of data transmission comprising:
locally recording the seismic data collected by the at least one seismic acquisition unit;
and a first transmission step of transmitting compressed data to the remote station with a compression rate depending on the data transmission rate or the time interval; and
using a linear predictive coding technique utilizing determination of prediction coefficients and prediction errors, a fraction of the prediction errors being transmitted in the first transmission step; and
a second subsequent transmission step of transmitting data to the remote station which permits recording without loss of the seismic data at the remote station with the transmitted data including fractions of the prediction errors not transmitted during the first transmission step.

32. A method for transmitting to a remote station seismic data sensed by seismic receivers and collected by at least one seismic acquisition unit from at least one transmitter by at least one transmission channel at a data transmission rate during a time interval of data transmission comprising:
locally recording the seismic data collected by the at least one seismic acquisition unit;
and a first transmission step of transmitting compressed data to the remote station with a compression rate depending on the data transmission rate or the time interval and the compressed data including at least a part of the seismic data record by each seismic acquisition unit;
and a second subsequent transmission step of transmitting data to the remote station which permits recording without loss of the seismic data at the remote station; and
further comprising using a linear predictive coding technique utilizing determination of prediction coefficients and prediction errors, a fraction of the prediction errors being transmitted in the first transmission step; and transmitting data in the second transmission step including fractions of the prediction errors not transmitted during the first transmission step.

33. A method for transmitting to a remote station seismic data sensed by seismic receivers and collected by at least one seismic acquisition unit from at least one transmitter by at least one transmission channel at a data transmission rate during a time interval of data transmission comprising:

locally storing the seismic data collected by the at least one seismic acquisition unit; and a first transmission step of transmitting compressed data to the remote station with a compression rate depending on the data transmission rate or the time interval's; and a second subsequent transmission step of transmitting data to the remote station which permits recording without loss of the seismic data at the remote station; and wherein each time interval is an interruption between cycles of a seismic session, each of the cycles including transmission of seismic data from a formation and reception and recording of seismic traces corresponding to signals of the formation in response to the transmitted signals, the transmitted compressed data containing the seismic traces compressed with a first compression rate, the seismic traces being locally recorded without loss with a second compression rate; and further comprising determining a difference between the seismic data recorded without loss and corresponding transmitted compressed data, transmitting the difference in the second transmission step and reconstructing at the remote station the seismic data collected by each seismic acquisition unit, by combining the data transmitted in the first and the second transmission steps.

34. A method for transmitting to a remote station seismic data sensed by seismic receivers and collected by at least one seismic acquisition unit from at least one transmitter by at least one transmission channel at a data transmission rate during a time interval of data transmission comprising:

locally storing the seismic data collected by the at least one seismic acquisition unit; and a first transmission step of transmitting compressed date to the remote station with a compression rate depending on the data transmission rate or the time interval; and a second subsequent transmission step of transmitting data to the remote station which permits recording without loss of the seismic data at the remote station; and the compressed data transmitted during the first transmission step is used for checking operation of the at least one acquisition unit and seismic receivers.

* * * * *